(12) United States Patent
Li et al.

(10) Patent No.: US 10,796,096 B2
(45) Date of Patent: Oct. 6, 2020

(54) SEMANTIC EXPRESSION GENERATION METHOD AND APPARATUS

(71) Applicant: SHANGHAI XIAOI ROBOT TECHNOLOGY CO., LTD., Shanghai (CN)

(72) Inventors: Zhi Li, Shanghai (CN); Pinpin Zhu, Shanghai (CN)

(73) Assignee: Shanghai Xiaoi Robot Technology Co., Ltd., Shanghai (CN)

( * ) Notice: Subject to any disclaimer, the term of this patent is extended or adjusted under 35 U.S.C. 154(b) by 173 days.

(21) Appl. No.: 16/004,734

(22) Filed: Jun. 11, 2018

(65) Prior Publication Data

US 2018/0357219 A1 Dec. 13, 2018

(30) Foreign Application Priority Data

Jun. 12, 2017 (CN) .......................... 2017 1 0439647

(51) Int. Cl.
*G06F 40/30* (2020.01)
*G06F 16/36* (2019.01)
(Continued)

(52) U.S. Cl.
CPC .......... *G06F 40/30* (2020.01); *G06F 16/3329* (2019.01); *G06F 16/3344* (2019.01); *G06F 16/36* (2019.01)

(58) Field of Classification Search
CPC .... G06F 40/211; G06F 40/253; G06F 40/284; G06F 40/30
See application file for complete search history.

(56) References Cited

U.S. PATENT DOCUMENTS 7,487,094 B1 * 2/2009 Konig ..................... G10L 15/19
379/88.01
7,496,621 B2 * 2/2009 Pan ......................... G06F 40/30
708/800
(Continued)

FOREIGN PATENT DOCUMENTS

CN 105677637 A 6/2016
CN 105912600 A 8/2016
(Continued)

OTHER PUBLICATIONS

Yong-Mei et al., Study on Sentence Similarity Approach of Automatic Ask and Answer System; Computer Technology and Development, vol. 22, No. 5, May 2012 (4 pages).
(Continued)

*Primary Examiner* — Lamont M Spooner
(74) *Attorney, Agent, or Firm* — FisherBroyles, LLP; Rob L. Phillips

(57) ABSTRACT

The present invention provides a method for generating a semantic expression for a standard question in a knowledge base. The knowledge base includes multiple standard questions, each standard question has multiple associated similar questions, and the method includes: for each standard question, obtaining multiple similar question segmentation results corresponding to the multiple similar questions of the standard question, where each similar question segmentation result includes word classes to which respective words in a corresponding similar question belong; for each standard question, selecting a phrase from an intersection of multiple similar question segmentation results of the standard question based on phrase occurrence frequencies, to form at least one semantic expression of the standard question, where each phrase includes a predetermined quantity of word classes; for all similar questions of all standard questions, performing standard question matching processing; for each (Continued)

semantic expression created for each standard question, determining whether the semantic expression is matched to at least one similar question of the standard question; and if yes, marking the semantic expression as a first state; or otherwise, marking the semantic expression as a second state; and deleting all semantic expressions in the second state.

20 Claims, 3 Drawing Sheets

(51) Int. Cl.
*G06F 16/332* (2019.01)
*G06F 16/33* (2019.01)

(56) References Cited

U.S. PATENT DOCUMENTS

| | | | | |
|---|---|---|---|---|
| 7,860,706 | B2* | 12/2010 | Abir | G06F 16/3337 704/4 |
| 8,335,683 | B2* | 12/2012 | Acero | G06F 40/216 704/9 |
| 9,201,945 | B1* | 12/2015 | Garrett | G06F 16/285 |
| 9,514,223 | B1* | 12/2016 | Garrett | G06F 16/285 |
| 9,916,349 | B2* | 3/2018 | Bolivar | G06F 40/284 |
| 2002/0194199 | A1* | 12/2002 | Flank | G06F 16/5846 |
| 2003/0171910 | A1* | 9/2003 | Abir | G06F 40/42 704/1 |
| 2004/0064447 | A1* | 4/2004 | Simske | G06F 16/3338 |
| 2004/0122656 | A1* | 6/2004 | Abir | G06F 16/30 704/4 |
| 2007/0005343 | A1* | 1/2007 | Sandor | G06F 16/334 704/9 |
| 2011/0202334 | A1* | 8/2011 | Abir | G06F 40/55 704/4 |
| 2014/0172900 | A1* | 6/2014 | De Barros | G06F 16/3322 707/765 |
| 2014/0324808 | A1* | 10/2014 | Sandhu | G06F 16/353 707/706 |
| 2014/0358890 | A1* | 12/2014 | Chen | G06F 16/3329 707/710 |

FOREIGN PATENT DOCUMENTS

| | | |
|---|---|---|
| CN | 105955965 A | 9/2016 |
| CN | 106528759 A | 3/2017 |
| JP | 2004118647 A | 4/2004 |
| JP | 2014134871 A | 7/2014 |

OTHER PUBLICATIONS

Chinese Office Action dated Jul. 1, 2019 for Chinese Application No. 201710439647.8 (5 pages).

* cited by examiner

SEMANTIC EXPRESSION GENERATION METHOD AND APPARATUS

BACKGROUND

Technical Field

The present invention relates to the field of human-machine interaction technologies, and in particular, to a method and an apparatus for generating a semantic expression for a standard question in a knowledge base.

Related Art

Human-machine interaction is a science of studying an interaction relationship between systems and users. The systems may be various machines, or may be computerized systems and software. For example, various artificial intelligence systems such as an intelligent customer service system and a voice control system may be implemented through human-machine interaction. Semantic recognition of artificial intelligence which can recognize a human language and convert it into a language that can be understood by a machine, is a basis of human machine interaction.

An intelligent question-answer system is a typical application of human machine interaction. After a user asks a question, the intelligent question-answer system gives an answer to the question. To this end, the intelligent question-answer system includes a knowledge base which includes a large quantity of questions and an answer to each question. The intelligent question-answer system first needs to recognize a question asked by a user, to be specific, find a question corresponding to the question of the user from the knowledge base, and then, find an answer matched to the question.

Therefore, how to efficiently maintain the knowledge base is very important.

SUMMARY

The following gives brief descriptions of one or more aspects to provide basic understanding of these aspects. The descriptions are not detailed descriptions of all constructed aspects, and are neither intended to identify key or determinant factors of all aspects nor intended to define the scope of any or all aspects. An only objective is to give some simple concepts of one or more aspects for subsequent detailed descriptions.

One aspect of the present invention provides a method for generating a semantic expression for a standard question in a knowledge base, where the knowledge base includes multiple standard questions, each standard question has multiple associated similar questions, and the method includes:

a data obtaining step: for each standard question, obtaining multiple similar question segmentation results corresponding to the multiple similar questions of the standard question, where each similar question segmentation result includes word classes to which respective words in a corresponding similar question belong;

a semantic expression creation step: for each standard question, selecting a phrase from an intersection of the multiple similar question segmentation results of the standard question based on phrase occurrence frequencies, to form at least one semantic expression of the standard question, where each phrase includes a predetermined quantity of word classes;

a detection step: for all similar questions of all standard questions, performing standard question matching processing; for each semantic expression created for each standard question, determining whether the semantic expression is matched to at least one similar question of the standard question; and if yes, marking the semantic expression as a first state; or otherwise, marking the semantic expression as a second state; and a deletion step: deleting all semantic expressions in the second state.

Another aspect of the present invention provides a computer device, including a memory, a processor, and a computer program stored in the memory and capable of running on the processor, and when executing the computer program, the processor implements the steps of the foregoing method.

Another aspect of the present invention provides a computer readable storage medium, storing a computer program, and the steps of the foregoing method are implemented when the computer program is executed by a processor.

Another aspect of the present invention provides an apparatus for generating a semantic expression for a standard question in a knowledge base, where the knowledge base includes multiple standard questions, each standard question has multiple associated similar questions, and the apparatus includes:

a data obtaining module, configured to: for each standard question, obtain multiple similar question segmentation results corresponding to the multiple similar questions of the standard question, where each similar question segmentation result includes word classes to which respective words in a corresponding similar question belong;

a semantic expression creation module, configured to: for each standard question, select a phrase from an intersection of the multiple similar question segmentation results of the standard question based on phrase occurrence frequencies, to form at least one semantic expression of the standard question, where each phrase includes a predetermined quantity of word classes;

a detection module, configured to: for all similar questions of all standard questions, perform standard question matching processing; for each semantic expression created for each standard question, determine whether the semantic expression is matched to at least one similar question of the standard question; and if yes, mark the semantic expression as a first state; or otherwise, mark the semantic expression as a second state; and an editing module, configured to delete all semantic expressions in the second state.

According to the solutions of the present invention, a semantic expression may be automatically generated from a common similar question, and the semantic expression has high efficiency and accuracy during semantic matching, thereby improving the performance of an intelligent question-answer system. In addition, the semantic expression does not need to be manually compiled, thereby greatly improving the semantic expression generation efficiency, and providing a basis for efficiently and conveniently setting up a knowledge base.

BRIEF DESCRIPTION OF THE DRAWINGS

The foregoing features and advantages of the present invention can be better understood after reading detailed descriptions of disclosed embodiments with reference to the following accompanying drawings. In the accompanying drawings, components may not be drawn according to a FIG. 1 is a flowchart of a method 100 for generating a semantic expression for a standard question in a knowledge base according to an aspect of the present invention.

DETAILED DESCRIPTION

Figure 1:
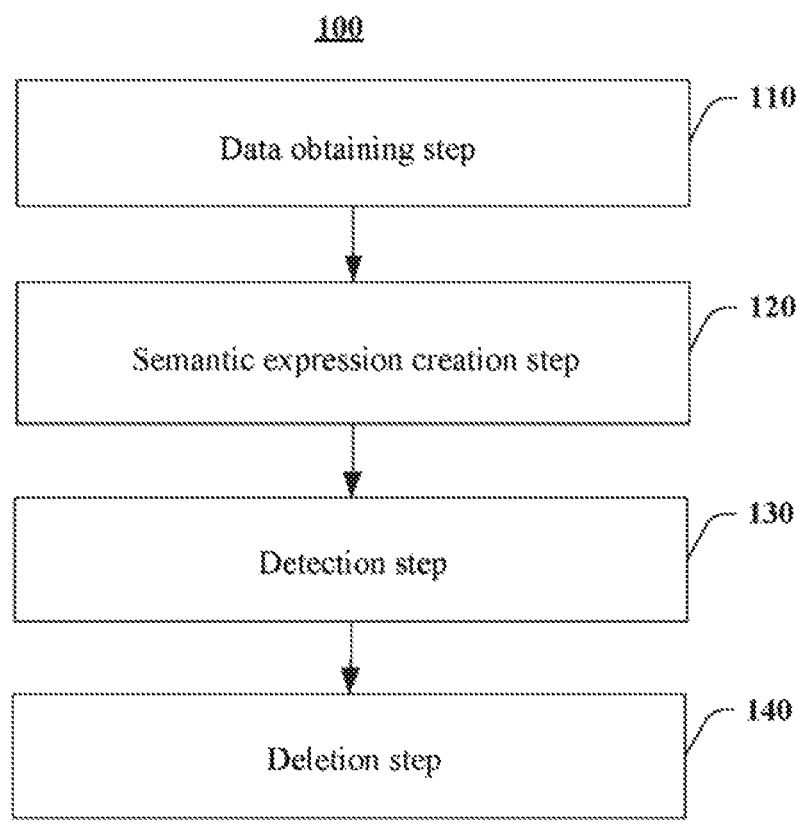

The following describes in detail the present invention with reference to the accompanying drawings and specific embodiments. It should be noted that the following aspects described with reference to the accompanying drawings and specific embodiments are merely exemplary, and should not be understood as a limitation to the protection scope of the present invention.

The original and simplest forms of basic knowledge points in the knowledge base are commonly used FAQs, and a general form is a "question-answer" pair. In the present invention, a "standard question" is a word content used to represent a knowledge point, with a main objective of clarified expression and facilitating maintenance. For example, "expense of a ring back tone" is a clear description of a standard question. The "question" herein should not be understood as "query" in a narrow sense, but should be understood as "input" in a broad sense, and the "input" should have corresponding "output". For example, for semantic recognition used for a control system, an instruction of a user, for example, "Turn on the radio", should also be understood as a "question". In this case, a corresponding "answer" may be invoking a control program used for executing corresponding control.

When a user makes an input to a machine, the most ideal case is to use a standard question, and an intelligent semantic recognition system of the machine can immediately understand an intention of the user. However, users usually do not use standard questions, but use some variants of standard questions. For example, if a standard question of channel switching of a radio is "Change a channel", a command possibly used by a user may be "Switch a channel", and the machine needs to be capable of recognizing that the user has the same intention.

Therefore, for intelligent semantic recognition, a knowledge base needs to include an extended question of a standard question, expression forms of which are slightly different from those of the standard question, but the extended question and the standard question have the same meaning. After a user inputs a user question, matching between the user question and a standard question is implemented mainly by using an extended question.

In an example, semantic similarity calculation may be performed between the user question and all extended questions of all standard questions in the knowledge base, to find an extended question having a highest semantic similarity with the user question, and if the highest semantic similarity is greater than a system-specified threshold, a standard question corresponding to the extended question is considered as a standard question matching the user question, and an answer in a knowledge point corresponding to the standard question is fed back to the user. On the other hand, if the calculated highest semantic similarity is less than the system-specified threshold, it is considered that standard question matching fails. In this case, a semantic recognition failure may be fed back to the user, to prompt the user that the user may make an input again.

In practice, a form of an extended question is a similar question in a form of a common question. A technician can manually make compilation without receiving special related training. An effect of matching between a similar question and a standard question is poor, and a large quantity of similar questions need to be manually compiled, leading to low efficiency.

Another form of an extended question is a semantic expression. One standard question may be represented by several semantic expressions. Standard question matching performed by using a semantic expression has a good effect, but it imposes higher requirements on an editing person, and efficiency needs to be further improved. Automatically generating semantic expressions by using similar questions is always a development direction. However, similar questions include a large amount of redundant information, and a semantic expression obtained by using an existing semantic expression automatic generation technology can hardly be directly used, and further needs manual modification. Consequently, actual efficiency is not obviously improved.

A semantic expression mainly includes a word, a word class, and an "or" relationship between them, and a core of the semantic expression relies on a "word class". A word class is simply understood as a group of words with common property. The words may be similar or may not be similar in terms of semantic, and the words may be marked as important or unimportant. A word class is an aggregation of a group of related words, and a word class includes a word class name and a group of related words. The word class name is a word having a tag function in the group of related words, namely, a representative of the word class. One word class includes at least one word (namely, the word class itself).

A relationship between a semantic expression and a user question greatly differs from conventional template matching. In the conventional template matching, a relationship between a template and a user question is merely matched or unmatched, but a relationship between a semantic expression and a user question is represented by using a quantized value (a similarity), and the quantized value may be compared with a similarity between a similar question and a user question. The following describes specific compositions of a semantic expression and meanings of symbols.

A word class is represented by using ([ ]).

To distinguish between a word and a word class, it is stipulated that a word class needs to be in square brackets "[ ]". A word class in square brackets is usually a "narrow word class", and may support a "broad word class" by configuring a system parameter. Word classes are divided according to the semanteme of words. A group of related words are organized into a tree structure word class library, and any non-leaf node in the tree structure is referred to as a word class (a broad word class), and a first-level word class directly including a word is referred to as a narrow word class.

The following gives examples of some simple expressions:

[how to][activate][fetion]
[introduce][a ring back tone][service]
[a method]for[logging in to][fetion]
[how to][charge for][the call reminder]

An or relationship is represented by using (|).

Word classes in square brackets may occur for multiple times by using an "or" relationship. Separate calculation is performed for the word classes in the "or" relationship in an "expansion" manner during similarity calculation. "Expansion" is a process of expanding a semantic expression into multiple simple expressions according to meaning of "or". For example, [a method|step]for[activating][ring back tone] may be expanded into two simple semantic expressions "[a step]for[activating][ring back tone]" and "[a method]for[activating][ring back tone]".

Examples of this category of semantic expressions are as follows:

[a method|step]for[activating][ring back tone]
[how to][query|learn][PUK code]
[unsubscribe to|cancel|close|deactivate][the domestic long distance preference package][IP|17951]
[feature fee|monthlyfee|messagefee|communicationfee] of[the call reminder]

Unnecessity is represented by using (?).

"?" may be added to the end of word classes in square brackets, to represent that the word class may occur or may not occur, namely, an unnecessity relationship. Separate calculation may also be performed for the unnecessary word class in an "expansion" manner during similarity calculation. "Expansion" is a process of expanding a semantic expression including an unnecessary word class (an "or combination" of word classes) into two simple semantic expressions that respectively include the word class and does not include the word class. For example, [introduce][what is?][content]of[the military column]of[the mobile video]may be expanded into two simple semantic expressions: [introduce][content]of[the military column]of[the mobile video] and [introduce][what is?][content]of[the military column]of[the mobile video].

Examples of this category of semantic expressions are as follows:

[a method|step?]for[cancelling][ring back tone]
[introduce][what is?][content]of[the military column]of[the mobile video]
[introduce][free][services?]of[high-quality life column]of[12580?][life broadcast]
[how to][activate][mobile data|traffic|internet surfing][100 Yuan RMB][package?][short message service]

In the present invention, multiple common similar question segmentation results are compared, and an intersection is obtained to obtain the shortest semantic expression. Error checking is performed to verify validity of semantic expressions, and filtering is performed by using the validity of the semantic expressions, to generate a common similar question of a lengthened semantic expression, and an invalid semantic expression is eliminated. Finally, a usable semantic expression is obtained through multiple times of cycle.

FIG. 1 is a flowchart of a method 100 for generating a semantic expression for a standard question in a knowledge base according to an aspect of the present invention. As shown in FIG. 1, the method 100 may include the following steps:

Step 110. Data obtaining step:

In this step, for each standard question, multiple similar question segmentation results corresponding to the multiple similar questions of the standard question are obtained, where each similar question segmentation result includes word classes to which respective words in a corresponding similar question belong.

The data obtaining step may include two parts. First, segmentation processing is performed on each similar question of each standard question. As described above, each standard question has multiple associated similar questions, and segmentation processing is performed on each similar question. The segmentation processing herein may be implemented by using any known segmentation algorithm, and details are not described herein again.

After segmentation, each similar question of each standard question is divided into multiple words, and each word is replaced by a word class of the word. Therefore, each similar question of a standard question corresponds to one segmentation result, and the multiple similar question segmentation results corresponding to multiple similar questions are obtained for each standard question.

In an example, six segmentation results of six similar questions of one standard question may be:

[A][B][C][D][E][F][G]
[A][B][K][J][L][M]
[A][C][M][Q]
[D][K][M][Q]
[A][B][C][D]
[A][B][D]

[A], [B], [C], [D], [E], [F], [G], [H], [J], and [K] are word classes in the segmentation result.

Step 120. Semantic expression creation step:

In this step, for each standard question, a phrase is selected from an intersection of the multiple similar question segmentation results of the standard question based on phrase occurrence frequencies, to form at least one semantic expression of the standard question, where each phrase includes a predetermined quantity of word classes.

In this embodiment, for each standard question, a phrase having a highest occurrence frequency is selected from the intersection of the multiple similar question segmentation results of the standard question, and is used as one semantic expression of the standard question. Then, a phrase having a highest occurrence frequency is selected from an intersection that is of the similar question segmentation results of the standard question and that does not include the phrase, and is used as one semantic expression of the standard question. The process is repeated until there is no other similar question segmentation result of the standard question or no intersection in which a quantity of word classes reaches the predetermined quantity exists among the remaining similar question segmentation results.

No intersection in which a quantity of word classes reaches the predetermined quantity exists among the remaining similar question segmentation results, the remaining similar question segmentation results are not used as materials for generating a semantic expression, and similar questions corresponding to the similar question segmentation results are directly used as extended questions for subsequent use.

The predetermined quantity of word classes forming a phrase may be greater than or equal to 1. In other words, the phrase itself may be a word class.

Using the six segmentation results of the six similar questions of the standard question as an example, assuming that the predetermined quantity of word classes forming each phrase is 1, in an intersection of the six segmentation results of the standard question: [A] occurs for five times, [B] occurs for four times, [C] occurs for three times, [D] occurs for three times, . . . .

Then, the word class [A] is used as a semantic expression of the standard question and is saved. In addition, a segmentation result not including [A] is only [D][K][M][Q]. Because only one segmentation result exists, and no intersection exists, a semantic expression generation process ends.

Assuming that the predetermined quantity of word classes forming each phrase is 2, in an intersection of the six segmentation results of the standard question, [A] and [B] have highest occurrence frequencies, and [A][B] is used as a semantic expression of the standard question. Two segmentation results not including [A] and [B] are [A][C][M][Q] and [D][K][M][Q], and an intersection between them is [M] and [Q], and [M][Q] is saved and used as a semantic expression of the standard question. In other words, when the predetermined quantity is 2, two semantic expressions [A][B] and [M][Q] are generated.

A semantic expression is generated for each standard question according to the foregoing process. Preferably, in the semantic expression creation step, the semantic expressions are created for the standard questions in ascending order of complexity, and during a creation process, if a semantic expression created for a standard question is the same as a semantic expression created for a preceding standard question, the same semantic expression is not used as the semantic expression of the standard question for saving.

Assuming that a semantic expression created for a standard question includes [A][B], if a semantic expression created for a following standard question also includes [A][B], the semantic expression [A][B] of the following standard question is not saved.

In practice, complexity is based on a quantity of words in a standard question, and a smaller quantity of words indicates lower complexity. Under the premise of a same quantity of words, a standard question including "introduce" or a synonym of "introduce" gains priority.

Step 130. Detection step:

In this step, standard question matching processing is performed for all similar questions of all standard questions; for each semantic expression created for each standard question, it is determined whether the semantic expression is matched to at least one similar question of the standard question; and if yes, the semantic expression is marked as a first state, for example, a state True; or otherwise, the semantic expression is marked as a second state, for example, a state False.

In practice, for each similar question, the performing standard question matching processing includes: performing semantic similarity calculation for the similar question and all semantic expressions generated for all standard questions, and matching the similar question to a semantic expression that has a highest semantic similarity, and the highest semantic similarity is greater than a threshold.

The detection step is an "error checking" process performed an initially created semantic expression of each standard questions. The core of error checking is to test, by using a similar question associated with each standard question as a test sample, whether semantic expression previously created for the standard question is feasible, to be specific, whether the similar question of the standard question can be matched to a previously automatically created semantic expression, and be further matched to the standard question.

If at least one similar question of the standard question can be matched to a semantic expression previously created for the standard question, it is considered that the semantic expression is feasible, and the semantic expression may be marked as the state True. It should be noted that standard question matching for a similar question of a standard question is performed in a scope of all semantic expressions generated for all standard questions. In other words, semantic similarity calculation is not only performed between the similar question and all semantic expressions of the standard question, but also performed between the similar question and all semantic expressions of the other standard questions. Therefore, for a similar question of a standard question, the similar question may be located and matched to a semantic expression of another standard question. In other words, for a semantic expression of a standard question, the semantic expression may match a similar question of another standard question.

If no similar question of a standard question can be matched to a semantic expression previously created for the standard question, the semantic expression is invalid even if a similar question of another standard question is located and matched to the semantic expression. All invalid semantic expressions may be marked as the state False.

On the other hand, during the standard question matching process above, for a similar question of a standard question, if the similar question is located and matched to any semantic expression of the standard question, in an embodiment, the similar question may be marked as a fourth state, for example, a state False; or if the similar question is not located or matched to any semantic expression of the standard question, for example, the matching fails (in other words, no semantic expression having a semantic similarity greater than a threshold is found), or is located to a semantic expression of another standard question (in other words, a semantic similarity between the similar question and the semantic expression of another standard question is the largest, or the similar question is "robbed" by the semantic expression of another standard question), the similar question is marked as a third state, for example, a state True.

Step 140. Deletion step:

In this step, all semantic expressions in the second state, for example, the state False, are deleted. Therefore, after deletion, the remaining semantic expression in all semantic expressions generated for a standard question is a valid semantic expression of the standard question.

In an embodiment, after step 140 of the deletion step is performed, the method further includes step 150: Perform standard question matching processing for all similar questions of all standard questions again, and if a similar question in the third state is matched to a semantic expression of an associated standard question, change the state of the similar question from the third state to the fourth state. The reason is that after a semantic expression in the state False (in other words, the semantic expression merely "robs" another similar question) is deleted, some similar questions in the third state (in other words, the similar question is "robbed") may be triggered to a standard question corresponding to the similar question.

Preferably, the semantic expression creation step, the detection step, and the deletion step may be cyclically performed for a predetermined quantity of steps, where the predetermined quantity of word classes forming the phrase in the semantic expression creation step increases with the cycle, and in the subsequent cycle, semantic expression creation is performed by using only a similar question in the state True.

In other words, in next cycle, during semantic expression creation, a quantity of word classes that is increased by 1 in the previous cycle is used to create a semantic expression. For example, it is assumed that the steps are cyclically performed for three times. In the first cycle, a phrase forming a semantic expression includes one word class, in the second cycle, a phrase forming a semantic expression includes two word classes, and in the third cycle, a phrase forming a semantic expression includes three word classes.

In addition, in the subsequent cycle, semantic expression creation is performed by using only a similar question in the state True. For example, in the first cycle, a phrase is selected from an intersection of multiple similar question segmentation results of one standard questions based on phrase occurrence frequencies, to form at least one semantic expression of the standard question. However, as described above, in the first cycle, after the detection step, some similar questions of the standard question are in the state True, and the others are in the state False. Then, in the second cycle, when the semantic expression creation step is performed, the semantic expression creation is performed by using only a similar question in the state True. Specifically, a phrase is selected from an intersection of similar question segmentation results in the state True of the standard question based on phrase occurrence frequencies, to form a semantic expression of the standard question.

Figure 2:
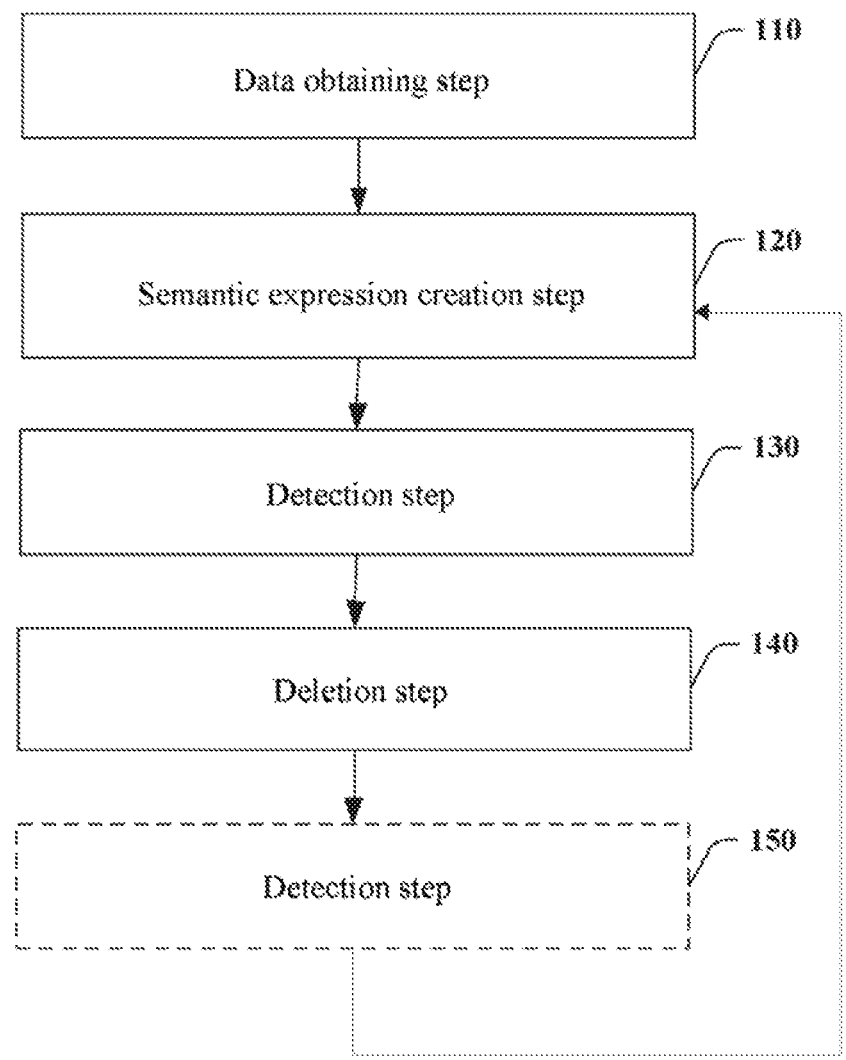
FIG. 2 is a flowchart of a method for generating a semantic expression for a standard question in a knowledge base according to a specific embodiment of the present invention.

After a predetermined quantity of times of cycle, a length of a semantic expression increases after each cycle, to create a more accurate and thorough semantic expression for each standard question. FIG. 2 is a flowchart of a method for generating a semantic expression for a standard question in a knowledge base according to a specific embodiment of the present invention.

Preferably, if the predetermined quantity of times of cycle is used as one routine, the routine may be repeated for several times, and in each subsequent routine, semantic expression creation is performed by using only a similar question in the state True. In other words, semantic expression creation is performed by using all similar questions in the semantic expression creation step only in the first cycle in the first routine, and semantic expression creation is performed by using only a similar question in the state True in all subsequent cycle in the first routine and in all cycle in subsequent routines.

Finally, the similar question in the state True may be used as an "extended question in a common question form" of the corresponding standard question and is used for similarity calculation in a standard question matching process.

The cycle and the routine are executed as follows:

```
k=1
for k≤j
{
i=m
for i≤n
{
``` step 120 to step 140 are cyclically performed

```
i=i+1
}
k=k+1
}
``` where m is a lower limit of a semantic expression, n is an upper limit of a semantic expression, i is a cycle index, j is a quantity of times that the routine is performed, and k is a routine index.

For example:
there are three standard questions:
Activate the ring back tone; cancel the ring back tone; introduce the ring back tone. Corresponding similar questions are as follows:
Similar questions of "Activate the ring back tone" are as follows:

I want to use the ring back tone;
How to activate the ring back tone;
How to start the ring back tone;
Help me to activate the ring back tone;
Help me to start the ring back tone;
Introduce how to start the ring back tone; and
Introduce a method for activating the ring back tone.
Similar questions of "Cancel the ring back tone" are as follows:
How to cancel the ring back tone;
How to close the ring back tone;
Help me to cancel the ring back tone;
Help me to close the ring back tone;
Introduce how to cancel the ring back tone;
Introduce a method for cancelling the ring back tone; and
I don't want to use the ring back tone any more.
Similar questions of "Introduce the ring back tone" are as follows:
What is the ring back tone;
Help me to introduce the ring back tone;
Introduce the ring back tone; and
Ring back tone?
It is assumed that m=1, n=3, and j=2.
The cycle starts from the lower limit 1 of i.

Step 120 is performed, and a generation length is set to 1 during generation of a semantic expression. A semantic expression [ring back tone] is generated for each standard question. Because a standard question including "introduce" gains priority during execution, a template [ring back tone] can be saved for only "Introduce the ring back tone", and a semantic expression cannot be saved for the other standard questions because a conflict occurs during saving. The conflict herein means that [ring back tone] has been previously saved as a semantic expression of another standard question, and this semantic expression cannot be saved as a semantic expression of a subsequent standard question.

Step 130 is performed. The similar question "Ring back tone?" of "Introduce the ring back tone" can be matched to the semantic expression "[ring back tone]", the similar question "Ring back tone?" is marked as "false", and the semantic expression "[ring back tone]" is marked as "true". The other similar questions of the standard question are marked as "true".

Step 140 is performed. No semantic expression is deleted, and a result is the same as that in the preceding step. On the other hand, if there is no similar question "Ring back tone?", the semantic expression "[ring back tone]" is deleted when this step is performed.

In the second cycle, i is increased to 2.
Step 120 is performed, and semantic expressions are separately generated for the three standard questions:
"[activate][ring back tone]", "[start][ring back tone]";
"[cancel][ring back tone]", "[close][ring back tone]"; and
"[introduce][ring back tone]".
Step 130 is performed, and no semantic expression is matched to the similar questions "I want to use the ring back tone", "Introduce how to start the ring back tone", and "Introduce a method for activating the ring back tone" of "Activate the ring back tone". Therefore, the similar questions are marked as "true", the other similar questions are marked as "false", and semantic expressions "[activate][ring back tone]" and "[start][ring back tone]" are marked as "true".

No semantic expression is matched to the similar questions "I don't want to use the ring back tone", "Introduce how to cancel the ring back tone", and "Introduce a method for cancelling the ring back tone" of "Cancel the ring back tone". Therefore, the similar questions are marked as "true", the other similar questions are marked as "false", and semantic expressions "[cancel][ring back tone]" and "[close][ring back tone]" are marked as "true".

No semantic expression is matched to the similar question "What is the ring back tone" of "Introduce the ring back tone". Therefore, the similar question is marked as "true", the other similar questions are marked as "false", and semantic expressions "[introduce][ring back tone]" and "ring back tone" are marked as true.

Step 140 is performed. No semantic expression is deleted, and a result is the same as that in the preceding step.

The third cycle is performed, and i=3.

Step 120 is performed. Semantic expressions [introduce][activate][ring back tone] are added for "Activate the ring back tone".

Semantic expressions [introduce][cancel][ring back tone] are added for "Cancel the ring back tone".

No new template is generated for "Introduce the ring back tone".

Step 130 is performed, and no semantic expression can be matched to each of three similar questions "I want to use the ring back tone", "I don't want to use the ring back tone", and "What is the ring back tone". Therefore, the similar questions still are in the state "true", the other similar questions are in the state "false", and all semantic expressions are matched to one or more similar questions of respective standard questions, and therefore, are in the state "true".

Step 140 is performed. No semantic expression is deleted, and a result is the same as that in the preceding step.

After the three times of cycle, as one routine, are performed completely, a next routine is performed until j=2 routines are performed completely. Finally, semantic expressions are respectively generated for the three standard questions as follows:

Semantic expressions of "Activate the ring back tone": "[activate][ring back tone]", "[start][ring back tone]", and "[introduce][activate][ring back tone]";

Semantic expressions of "Cancel the ring back tone": "[cancel][ring back tone]", "[close][ring back tone]", and "[introduce][cancel][ring back tone]"; and Semantic expressions of "Introduce the ring back tone": "[introduce][ring back tone]", and "[ring back tone]".

In addition, similar questions "I want to use the ring back tone", "I don't want to use the ring back tone", and "What is the ring back tone" may be used as common extended questions of respective standard questions. In this case, accuracy obtained when all similar questions are used as testing samples for error checking reaches 100%.

Although the methods are represented by using drawings and are described as a series of actions to simplify descriptions, it should be understood that the methods are not limited by an order of actions because in one or some embodiments, some actions may occur in different orders and/or occur together with other actions described in the accompanying drawings of this specification or other actions that are not described in the accompanying drawings of this specification but a person skilled in the art may understand.

Figure 3:
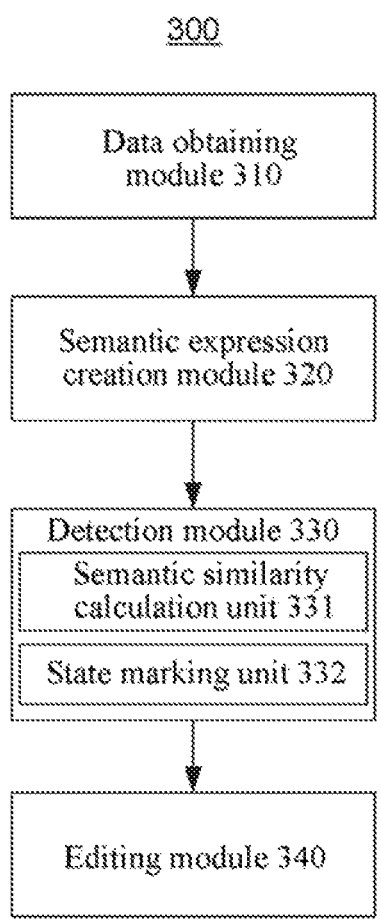
FIG. 3 is a block diagram of an apparatus 300 for generating a semantic expression for a standard question in a knowledge base according to an aspect of the present invention.

FIG. 3 is a block diagram of an apparatus 300 for generating a semantic expression for a standard question in a knowledge base according to one aspect of the present invention. The knowledge base includes multiple standard questions, and each standard question has multiple associated similar questions.

The apparatus 300 may include a data obtaining module 310, a semantic expression creation module 320, a detection module 330, and an editing module 340. The data obtaining module 310 may be configured to: for each standard question, obtain multiple similar question segmentation results corresponding to the multiple similar questions of the standard question, where each similar question segmentation result includes word classes to which respective words in a corresponding similar question belong.

The semantic expression creation module 320 may be configured to: for each standard question, select a phrase from an intersection of the multiple similar question segmentation results of the standard question based on phrase occurrence frequencies, to form at least one semantic expression of the standard questions, where each phrase includes a predetermined quantity of word classes. The predetermined quantity may be greater than or equal to 1.

In an example, the semantic expression creation module 320 is configured to: for each standard question, select a phrase having a highest occurrence frequency from the intersection of the multiple similar question segmentation results of the standard question, use the phrase as one semantic expression of the standard question, then, select a phrase having a highest occurrence frequency from an intersection that is of the similar question segmentation results of the standard question and that does not include the phrase, use the selected phrase as one semantic expression of the standard question, and repeat the process until there is no other similar question segmentation result of the standard question or no intersection in which a quantity of word classes reaches the predetermined quantity exists among the remaining similar question segmentation results.

No intersection in which a quantity of word classes reaches the predetermined quantity exists between the remaining similar question segmentation results, the remaining similar question segmentation results are not used as materials for generating a semantic expression, and similar questions corresponding to the similar question segmentation results are directly used as extended questions for subsequent use.

In an example, complexity is based on a quantity of words in a standard question, and a smaller quantity of words indicates lower complexity.

Preferably, the semantic expression creation module 320 may be configured to create the semantic expressions for the standard questions in ascending order of complexity, where during a creation process, if a semantic expression created for a standard question is the same as a semantic expression created for a preceding standard question, the same semantic expression is not used as the semantic expression of the standard question for saving.

The detection module 330 may be configured to perform standard question matching processing for all similar questions of all standard questions; for each semantic expression created for each standard question, determine whether the semantic expression is matched to at least one similar question of the standard question; and if yes, mark the semantic expression as a first state, for example, a state True; or otherwise, mark the semantic expression as a second state, for example, a state False.

In an example, the detection module 330 may include a semantic similarity calculation unit 331, configured to: for each similar question, perform semantic similarity calculation for the similar question and all semantic expressions generated for all standard questions, and match the similar question to a semantic expression that has a highest semantic similarity, and the highest semantic similarity is greater than a threshold.

The detection step of the detection module 330 is an "error checking" process performed an initially created semantic expression of each standard question. The core of error checking is to test, by using a similar question associated with each standard question as a test sample, whether semantic expression previously created for the standard question is feasible, to be specific, whether the similar question of the standard question can be matched to a previously automatically created semantic expression, and be further matched to the standard question.

If at least one similar question of the standard question can be matched to a semantic expression previously created for the standard question, it is considered that the semantic expression is feasible, and the semantic expression may be marked as the state True. It should be noted that standard question matching for a similar question of a standard question is performed in a scope of all semantic expressions generated for all standard questions. In other words, semantic similarity calculation is not only performed between the similar question and all semantic expressions of the standard question, but also performed between the similar question and all semantic expressions of the other standard questions. Therefore, for a similar question of a standard question, the similar question may be located and matched to a semantic expression of another standard question. In other words, for a semantic expression of a standard question, the semantic expression may match a similar question of another standard question.

If no similar question of a standard question can be matched to a semantic expression previously created for the standard question, the semantic expression is invalid even if a similar question of another standard question is located and matched to the semantic expression. All invalid semantic expressions may be marked as the state False.

Finally, the editing module 340 may delete all semantic expressions in the state False. The remaining semantic expression is an obtained valid semantic expression.

Further, the detection module 330 may further include a state marking unit 332, configured to: after the semantic similarity calculation unit 331 performs standard question matching processing, for each similar question of each standard question, determine whether the similar question is matched to a semantic expression of an associated standard question; and if yes, mark the similar question as a fourth state, for example, a state False; or otherwise, if the similar question is not located or matched to any semantic expression of the standard question, for example, the matching fails (in other words, no semantic expression having a semantic similarity greater than a threshold is found), or is located to a semantic expression of another standard question (in other words, a semantic similarity between the similar question and the semantic expression of another standard question is the largest, or the similar question is "robbed" by the semantic expression of another standard question), mark the similar question as a third state, for example, a state True.

In this example, the semantic expression creation module 320, the detection module 330, and the editing module 340 cyclically perform the semantic expression creation step, the detection step, and the deletion step in sequence for a predetermined quantity of times. The predetermined quantity of word classes used by the semantic expression creation module 330 to form the phrase increase with the cycle. In other words, in the next cycle, during semantic expression creation, a semantic expression is created by using a quantity of word classes that is obtained by adding 1 to the quantity of words in the previous cycle. For example, it is assumed that the steps are cyclically performed for three times. In the first cycle, a phrase forming a semantic expression includes one word class, in the second cycle, a phrase forming a semantic expression includes two word classes, and in the third cycle, a phrase forming a semantic expression includes three word classes. In the subsequent cycle, the semantic expression creation module creates a semantic expression by using only a similar question in the state True.

After a predetermined quantity of times of cycle, a length of a semantic expression increases after each cycle, to create a more accurate and thorough semantic expression for each standard question.

In each cycle period, after the editing module 340 performs the deletion step, the detection module 330 may immediately perform standard question matching processing for all similar questions of all standard questions again, and if a similar question in the third state is matched to a semantic expression of an associated standard question, the state marking unit changes the state of the similar question from the third state to the fourth state. The reason is that after a semantic expression in the state False (in other words, the semantic expression merely "robs" another similar question) is deleted, some similar questions in the third state (in other words, the similar question is "robbed") may be triggered to a standard question corresponding to the similar question.

In a further example, the predetermined quantity of times of cycle is one routine. The semantic expression creation module 320, the detection module 330, and the editing module 340 repeat the routine for several times. In each subsequent routine, semantic expression creation is performed by using only a similar question in the state True.

The present invention provides a computer device, including a memory, a processor, and a computer program stored in the memory and capable of running on the processor, and when executing the computer program, the processor implements the steps of the foregoing method.

The present invention further provides a computer readable storage medium, storing a computer program, and the steps of the foregoing method are implemented when the computer program is executed by a processor.

For specific implementations and technical effects of the computer device, the computer readable storage medium, and the apparatus for generating a semantic expression for a standard question in a knowledge base, refer to the embodiment of the method for generating a semantic expression for a standard question in a knowledge base, and details are not described herein again.

According to the solutions of the present invention, a semantic expression may be automatically generated from a common similar question, and the semantic expression has high efficiency and accuracy during semantic matching, thereby improving the performance of an intelligent question-answer system. In addition, the semantic expression does not need to be manually compiled, thereby greatly improving the semantic expression generation efficiency, and providing a basis for efficiently and conveniently setting up a knowledge base.

A person skilled in the art is further aware that various interpretive logical blocks, modules, circuits, and algorithm steps described with reference to the embodiments disclosed in this specification may be implemented as electronic hardware, computer software, and a combination of the two. To clearly describe interchangeability between the hardware and the software, various interpretive components, blocks, modules, circuits, and steps are generally described in a form of functionality. Whether the functionality is implemented as hardware or software depends on a specific application and a design restraint imposed to an entire system. For each particular application, a technician may implement the described functionality in a different manner, and this implementation decision should not be understood as departing from the scope of the present invention.

Various logical modules and circuits described with reference to the embodiments disclosed with reference to this specification may be implemented or executed by using a general purpose processor, a digital signal processor (DSP), an application-specific integrated circuit (ASIC), a field-programmable gate array (FPGA) or another programmable logical component, a discrete gate or transistor logic, a discrete hardware component, or any combination designed to implement functions described in this specification. The general purpose processor may be a micro processor. However, in an alternative solution, the processor may be any conventional processor, controller, micro controller, or state machine. The processor may be alternatively implemented as a combination of computing devices, for example, a combination of a DSP and a micro processor, multiple micro processors, one or more micro processors coordinated with a core of a DSP, or any other such configuration.

Steps of the method or algorithm described with reference to the embodiments disclosed in this specification may be directly reflected in hardware, a software module executed by the processor, or a combination of the two. The software module may reside in a RAM memory, a flash memory, a ROM memory, an EPROM memory, an EEPROM memory, a register, a hard disk, a removable disk, a CD-ROM, or a storage medium in any other form known in the art. Exemplarily, the storage medium is coupled to the processor, so that the processor can read information from and write information into the storage medium. In an alternative solution, the storage medium may be integrated into the processor. The processor and the storage medium may reside in the ASIC. The ASIC may reside in a user terminal. In an alternative solution, the processor and the storage medium may reside in the user terminal as discrete components.

In one or more exemplary embodiments, the described functions may be implemented in hardware, software, firmware, or any combination thereof. If the described functions are implemented as a computer program product in software, each function may be used as one or more instructions or code and stored in a computer readable medium or sent by using a computer readable medium. The computer readable medium includes a computer storage medium and a communications medium, and includes any medium driving the computer program to be migrated from one place to another place. The storage medium may be any available medium accessible by a computer. As an example rather than limitation, the computer readable medium may include a RAM, a ROM, an EEPROM, a CD-ROM, or another optical storage, magnetic storage or another magnetic storage device, or any other medium capable of carrying or storing desired program code in a form of an instruction or a data structure and accessible by the computer. Any connection should be properly referred to as a computer readable medium. For example, if software is transferred from a website, a server, or another remote source by using a coaxial cable, an optical fiber cable, a twisted pair, a digital subscriber line (DSL), or a wireless technology such as infrared, radio, or microwave, the coaxial cable, the optical fiber cable, the twisted pair, the DSL, or the wireless technology such as infrared, radio, or microwave should be included in the definition of the medium. A disk and a disc used in this specification include a compact disc (CD), a laser disc, an optical disc, a digital versatile disc (DVD), a floppy disk, and a blue ray disk. The disk generally reproduces data in a magnetic manner, and the disc reproduces data by using laser in an optical manner. The combination should also be included in a scope of the computer readable medium.

Prior descriptions of this disclosure are provided, so that any person skilled in the art can manufacture or use this disclosure. Various modifications made to this specification are obvious to a person skilled in the art, and a pervasive principle defined in this specification may be applied to another variant without departing from the spirit or scope of this disclosure. Therefore, this disclosure is not intended to be limited to the example and design described in this specification, but should be granted the broadest range consistent with the principle and novelty feature disclosed in this specification.

What is claimed is:

1. A method for generating a semantic expression for a standard question in a knowledge base, wherein the knowledge base comprises multiple standard questions, each standard question has multiple associated similar questions, and the method comprises:

a data obtaining step: for each standard question, obtaining multiple similar question segmentation results corresponding to the multiple similar questions of the standard question, wherein each similar question segmentation result comprises word classes to which respective words in a corresponding similar question belong;

a semantic expression creation step: for each standard question, selecting a phrase from an intersection of the multiple similar question segmentation results of the standard question based on phrase occurrence frequencies, to form at least one semantic expression of the standard question, wherein each phrase comprises a predetermined quantity of word classes;

a detection step: for the multiple similar questions of each standard questions, performing standard question matching processing; for each semantic expression created for each standard question, determining whether the semantic expression is matched to at least one similar question of the standard question; and if yes, marking the semantic expression as a first state; or otherwise, marking the semantic expression as a second state; and a deletion step: deleting all semantic expressions in the second state.

2. The method according to claim 1, wherein in the semantic expression creation step, for each standard question, a phrase having a highest occurrence frequency is selected from the intersection of the multiple similar question segmentation results of the standard question, the selected phrase is used as one semantic expression of the standard question, then, a phrase having a highest occurrence frequency is selected from an intersection that is of the similar question segmentation results of the standard question and that does not comprise the phrase, and the selected phrase is used as one semantic expression of the standard question, and the process is repeated until there is no other similar question segmentation result of the standard question or no intersection in which a quantity of word classes reaches the predetermined quantity exists among the remaining similar question segmentation results.

3. The method according to claim 1, wherein in the detection step, for each similar question, the performing standard question matching processing comprises: performing semantic similarity calculation for the similar question and all each semantic expressions created for each standard questions, and matching the similar question to a semantic expression that has a highest semantic similarity, and the highest semantic similarity greater than a threshold.

4. The method according to claim 1, wherein the detection step further comprises: after performing standard question matching processing, for each similar question of each standard question, determining whether the similar question is matched to a semantic expression of the associated standard question; and if yes, marking the similar question as a fourth state; or otherwise, marking the similar question as a third state, wherein the method further comprises: cyclically performing the semantic expression creation step, the detection step, and the deletion step for a predetermined quantity of times, wherein the predetermined quantity of word classes forming the phrase in the semantic expression creation step increases with the cycle, and in the subsequent cycle, semantic expression creation is performed by using only a similar question in the third state.

5. The method according to claim 4, wherein in each cycle period, after the deletion step is performed, standard question matching processing is performed for all similar questions of all standard questions again, and then, if a similar question in the third state is matched to a semantic expression of an associated standard question, the state of the similar question is changed from the third state to the fourth state.

6. The method according to claim 4, wherein the predetermined quantity of times of cycle is used as one routine, the routine is repeated for several times, and in each subsequent routine, semantic expression creation is performed by using only a similar question in the third state.

7. The method according to claim 1, wherein the predetermined quantity is greater than or equal to 1.

8. The method according to claim 1, wherein in the semantic expression creation step, the semantic expressions are created for the standard questions in ascending order of complexity, and during a creation process, if a semantic expression created for a standard question is the same as a semantic expression created for a preceding standard question, the same semantic expression is not used as the semantic expression of the standard question for saving.

9. The method according to claim 8, wherein the complexity is based on a quantity of words of a standard question, and a smaller quantity of words indicates lower complexity.

10. A computer device, comprising a memory, a processor, and a computer program stored in the memory and capable of running on the processor, wherein when executing the computer program, the processor implements the steps of the method according to claim 1.

11. The computer device according to claim 10, wherein the processor implements the steps of the method according to claim 2.

12. An apparatus for generating a semantic expression for a standard question in a knowledge base, wherein the knowledge base comprises multiple standard questions, each standard question has multiple associated similar questions, and the apparatus comprises:
 a memory storing a computer program; and
 a processor coupled to the memory configured to execute the computer program to: for each standard question, obtain multiple similar question segmentation results corresponding to the multiple similar questions of the standard question, wherein each similar question segmentation result comprises word classes to which respective words in a corresponding similar question belong;
 for each standard question, select a phrase from an intersection of the multiple similar question segmentation results of the standard question based on phrase occurrence frequencies, to form at least one semantic expression of the standard question, wherein each phrase comprises a predetermined quantity of word classes;
 for the multiple similar questions of each standard questions, perform standard question matching processing; for each semantic expression created for each standard question, determine whether the semantic expression is matched to at least one similar question of the standard question; and if yes, mark the semantic expression as a first state; or otherwise, mark the semantic expression as a second state; and
 delete all semantic expressions in the second state.

13. The apparatus according to claim 12, wherein the processor is further configured to execute the comoputer program to: for each standard question, select a phrase having a highest occurrence frequency from the intersection of the multiple similar question segmentation results of the standard question, use the phrase as one semantic expression of the standard question, then, select a phrase having a highest occurrence frequency from an intersection that is of the similar question segmentation results of the standard question and that does not comprise the phrase, use the selected phrase as one semantic expression of the standard question, and repeat the process until there is no other similar question segmentation result of the standard question or no intersection in which a quantity of word classes reaches the predetermined quantity exists among the remaining similar question segmentation results.

14. The apparatus according to claim 12, wherein the processor is further configured to execute the computer program: for each similar question, perform semantic similarity calculation for the similar question and all each semantic expressions created for each standard questions, and match the similar question to a semantic expression that has a highest semantic similarity, and the highest semantic similarity greater than a threshold.

15. The apparatus according to claim 12, wherein the processor is further configured to execute the computer program to: after standard question matching processing is performed, for each similar question of each standard question, determine whether the similar question is matched to a semantic expression of the associated standard question; and
 if yes, mark the similar question as a fourth state; or otherwise, mark the similar question as a third state, wherein the semantic expression creation module, the detection module, and the editing module cyclically perform the semantic expression creation step, the detection step, and the deletion step in sequence for a predetermined quantity of times, the predetermined quantity of word classes used by the semantic expression creation module to form the phrase increases with the cycle, and in the subsequent cycle, the semantic expression creation module creates a semantic expression by using only a similar question in the third state.

16. The apparatus according to claim 15, wherein the processor is further configured to execute the computer program to:
 in each cycle period, after the editing module performs the deletion step, perform standard question matching processing for all similar questions of all standard questions again, and if a similar question in the third state is matched to a semantic expression of an associated standard question, marks the state of the similar question from the third state to the fourth state.

17. The apparatus according to claim 15, wherein the predetermined quantity of times of cycle is used as a routine, the processor is further configured to execute the computer program to: repeat the routine for several times, and in each subsequent routine, semantic expression creation is performed by using only a similar question in the third state.

18. The apparatus according to claim 12, wherein the predetermined quantity is greater than or equal to 1.

19. The apparatus according to claim 12, wherein the processor is further configurred to execute the computer program to:

create the semantic expressions for the standard questions in ascending order of complexity, and during a creation process, if a semantic expression created for a standard question is the same as a semantic expression created for a preceding standard question, the semantic expression is not used as the semantic expression of the standard question for saving.

20. The apparatus according to claim 19, wherein the complexity is based on a quantity of words of a standard question, and a smaller quantity of words indicates lower complexity.

\* \* \* \* \*